(12) United States Patent
Kimura et al.

(10) Patent No.: US 8,360,383 B2
(45) Date of Patent: Jan. 29, 2013

(54) SEAT SLIDING DEVICE

(75) Inventors: Gakuji Kimura, Inuyama (JP);
Yuusuke Satou, Inuyama (JP); Kensuke Miyoshi, Inuyama (JP); Nobuyuki Murai, Inuyama (JP)

(73) Assignee: Kabushiki Kaisha Imasen Denki Seisakusho, Inuyama-Shi (Aichi) (JP)

( * ) Notice: Subject to any disclaimer, the term of this patent is extended or adjusted under 35 U.S.C. 154(b) by 114 days.

(21) Appl. No.: 12/994,749

(22) PCT Filed: May 11, 2009

(86) PCT No.: PCT/JP2009/058758
§ 371 (c)(1),
(2), (4) Date: Jan. 25, 2011

(87) PCT Pub. No.: WO2009/145045
PCT Pub. Date: Dec. 3, 2009

(65) Prior Publication Data
US 2011/0121154 A1 May 26, 2011

(30) Foreign Application Priority Data
May 29, 2008 (JP) ................................ 2008-140329

(51) Int. Cl.
F16M 13/00 (2006.01)
(52) U.S. Cl. ...................................... 248/430
(58) Field of Classification Search ................. 248/424, 248/429, 430; 296/65.14; 297/344.11
See application file for complete search history.

(56) References Cited

U.S. PATENT DOCUMENTS

| | | | | |
|---|---|---|---|---|
| 5,020,853 A | * | 6/1991 | Babbs | 297/341 |
| 7,950,736 B2 | * | 5/2011 | Olson | 297/215.14 |
| 2009/0102263 A1 | * | 4/2009 | Kojima et al. | 297/344.1 |
| 2009/0218843 A1 | * | 9/2009 | Wojatzki et al. | 296/65.13 |
| 2011/0089305 A1 | * | 4/2011 | Yamada et al. | 248/429 |
| 2011/0233366 A1 | * | 9/2011 | Mizuno et al. | 248/429 |
| 2012/0032059 A1 | * | 2/2012 | Seille | 248/429 |
| 2012/0168595 A1 | * | 7/2012 | Gray et al. | 248/429 |

FOREIGN PATENT DOCUMENTS

| | | | |
|---|---|---|---|
| JP | 2004-148854 A | 5/2004 | |
| JP | 2008-024110 A | 2/2008 | |
| JP | 2008-056104 A | 3/2008 | |

* cited by examiner

Primary Examiner — Ramon Ramirez
(74) Attorney, Agent, or Firm — Lucas & Mercanti, LLP

(57) ABSTRACT

A seat sliding device for preventing accidental operation of the operation member. The seat sliding device includes a biasing member 60 which biases a lock member 50 in response to the operation of an operation lever 70 in an unlocking pivoting direction and which is tiltable around a shaft 62 as the tilting center together with the operation lever 70 in response to the operation of the operation lever 70. A balancer 64 of the biasing member 60 has a shape and mass, etc. adapted so as to bring a position of the center of gravity of the tilting body including the operation lever 70 and the biasing member 60 close to the shaft center of the shaft 62.

5 Claims, 13 Drawing Sheets

SEAT SLIDING DEVICE

This is a U.S. National Phase Application under 35 U.S.C. 371 of International Application PCT/JP2009/58758, filed on May 11, 2009. This Application claims the priority of Japanese Application No. 2008-140329, filed May 29, 2008, the entire contents of both Applications are hereby incorporated by reference.

TECHNICAL FIELD

The present invention relates to a seat sliding device for adjusting a seat for a vehicle back and forth.

BACKGROUND ART

Conventionally, as a seat sliding device for a vehicle that is for adjusting a seat for a vehicle back and forth, a seat sliding device for a vehicle disclosed in Patent Document 1 described below is known. In the lock mechanism of this seat sliding device for a vehicle, the nails of the lock lever tiltably fixed to the upper rail engage the engaging holes of the lower rail and the engaging holes of the upper rail and the like, thereby immovably locking the upper rail relative to the lower rail. When the lock lever is tilted by operation of the operation lever and the nails are pulled out from the engaging holes of the lower rail and the engaging holes of the upper rail and the like, the above-mentioned lock state is released.

PRIOR ART DOCUMENT

Patent Document

Patent Document 1: Japanese Unexamined Patent Application. Publication No. 2002-151356

SUMMARY OF THE INVENTION

Problem to be Solved by the Invention

It is assumed that, when a vehicle having passengers collides or brakes suddenly or in a similar case, accidental contact with the operation lever may tilt the operation lever in the unlocking direction, causing an unlocked state of the lock mechanism. Also, in the event of a collision or a sudden braking as described above, the self-weight of the operation lever may tilt the operation lever in the unlocking direction, resulting in an unlocked state of the lock mechanism. To solve the above problems, the force applied in unlocking the lock mechanism according to the tilting motion of the operation lever needs to be reduced so as to prevent an easy release of the lock. For that purpose, it is necessary to adjust the position of the center of gravity of the tilting body including the operation lever so that it comes close to the tilting center.

The operation lever as described above, however, is formed in an extending manner so that it comes in contact with the lock lever to press and move the lock lever when locking. Therefore, the center of gravity of the above tilting body is uniquely determined, resulting in a difficulty in adjustment.

The present invention is made to solve the above-mentioned problems and an object of the invention is to provide a seat sliding device which prevents accidental operation of the operation member.

Means for Solving the Problem

To achieve the above object, the seat sliding device (10) includes a lower rail member (30) fixed to a vehicle body (B); an upper rail member (20) fixed to a seat (S) and slidably provided to the lower rail member; a lock member (50) having a locking side engaging part (55) which can engage with or disengage from a lower rail side engaged part (35a) of a lower rail member and an upper rail side engaged part (22a, 23a) of the upper rail member; and an operation member (70) which is operated to switch between a locked state in which the locking side engaging part engages with the lower rail side engaging part and the upper rail side engaging part and an unlocked state in which the locked state is released, wherein a biasing member (60) is provided, which biases the lock member in the unlocking direction in response to the operation of the operation member for switching to the unlocked state and can pivot around a predetermined tilting center (L), technically characterized in that the position of the center of gravity of the biasing member is adjusted so that a tilting body including the operation member and the biasing member, which tilts around the predetermined tilting center, is brought close to the predetermined tilting center.

Effects of the Invention

According to the invention, the seat sliding device includes a biasing member which biases the lock member in the unlocking direction in response to the operation of the operation member for switching to the unlocked state and can pivot around the predetermined tilting center in response to the operation of the operation member. The position of the center of gravity of the biasing member is adjusted so that a tilting body including the operation member and the biasing member, which tilts around the predetermined tilting center, is brought close to the predetermined tilting center.

As a result, the position of the center of gravity of the tilting body including the operation member and the biasing member becomes close to the predetermined tilting center, resulting in reduction of a force applied when unlocking the lock mechanism in response to the tilting motion of the operation lever and prevention of accidental operation of the operation lever.

In addition, since the position of the center of gravity of the tilting member can be adjusted by adjusting the position of the center of gravity of the biasing member, the adjustment work for bringing the position of the center of gravity of the tilting body close to the predetermined tilting center can be conducted easily.

Therefore, accidental operation of the operation member can be prevented.

According to the invention, the biasing member includes a contact part is formed so that it contacts the operation member which tilts around the predetermined tilting center from the locked state to the unlocking direction but does not contact the operation member which tilts around the predetermined tilting center from the locked state to the counter unlocking direction.

Generally, fittings for a seat belt are fixed, via fixing members, to the vehicle seat in the vicinity of the counter operation member side of the lower rail member and the upper rail member in the interior of the vehicle (hereinafter referred to as the inside rail members). In an event of a collision of the car, when a strong impact is applied to the vehicle seat where a passenger fastening a seat belt is seated, a strong tension to the fixture of the seat belt is generated. With this tension, the counter operation member side of the inside rail members move upward, while the lower rail member and the upper rail member on the outside of the vehicle (hereinafter also referred to as the outside rail members) do not move.

In the operation member which couples the respective connecting portions extending from each end of the gripper to both the inside rail member and the outside rail members to switch between a locked state and an unlocked state, when only the counter operation member side of the inside rail members move upward as mentioned above, the inside rail member tilts so that its operation member side moves downward. The operation member, which is connected to the biasing member of the inside rail members which tilt as described above, tilts in the direction where the gripper is moved downward, that is, in the counter unlocking direction which is opposite to the unlocking direction. Then, the side of the outside rail members of the gripper moves upward, that is, in the unlocking direction. As a result, the outside rail members are unlocked irrespective of a passenger's intention.

The biasing member is formed so as not to contact the operation member which tilts around the predetermined tilting center from the locked state to the counter unlocking; direction. Therefore, only the counter operation member side of the inside rail members moves upward and the operation member does not tilt in response to the tilting motion of the biasing member in the counter unlocking direction. On the other hand, the biasing member includes a contact part which can contact the operation member tilting around the predetermined tilting center from the locked state to the unlocking direction, and therefore, tilting motion of the operation member in the unlocking direction can be transferred to the lock member via the biasing member.

Therefore, such an accidental operation of the operation member caused by an impact force as described above that leads to an unlocking of the outside rail members can be prevented.

According to the invention, the biasing member includes a first tilting member which tilts around the predetermined tilting center in response to the operation of the operation member and a second tilting member which is supported so as to tilt around the predetermined tilting center and allows the lock member to bias in the unlocking direction. Either one of the first tilting member and the second tilting member includes an engaging hole formed and the other member includes an engaging shaft which engages with the engaging hole so as to allow a relative movement around the predetermined tilting center in the circumferential direction. The second tilting member tilts together with the first tilting member in the unlocking direction and biases the lock member in the unlocking direction, by bringing the engaging shaft in contact with an inner circumferential face of the engaging hole when the first tilting member tilts from the locked state in the unlocking direction. The position of the center of gravity of at least one of the first tilting member and the second tilting member is adjusted so as to bring the position of the center of gravity of the tilting body close to the predetermined tilting center.

Therefore, when the first tilting member tilts from the locked state to the unlocking direction by operation of the operation member, the engaging shaft comes in contact with the inner circumferential face of the engaging hole, thereby tilting the second tilting member around the predetermined tilting center in the unlocking direction in response to the tilting motion of the first tilting; member in response to the tilting motion of the second tilting member, the lock member is biased in the unlocking direction. Therefore, the locked state can be released reliably in response to the operation of the operation member.

On the other hand, when only the other side of the operation member of the inside rail members moves upward as described above, the second tilting member which biases the lock member of the inside rail members tilts around the predetermined tilting center from the locked state to the counter unlocking direction. At this time, the engaging shaft moves around the predetermined tilting center relative to the engaging hole without coming in contact with the inner circumferential face of the engaging hole. Therefore, the first tilting member and the operation member do not tilt in response to the tilting motion in the counter unlocking direction of the second tilting member.

In this way, too, such an accidental operation of the operation member caused by an impact force as described above that can lead to release of a lock of the outside rail members can be prevented.

According to the invention, the biasing member includes a biasing piece which biases the first tilting member in the unlocking direction by such a biasing force that does not unlock the lock member. Thus, since the first tilting member is biased in the unlocking direction by such a biasing force that the lock member is not unlocked by the biasing piece, the first tilting member tilts in the unlocking direction until the engaging shaft comes in contact with the inner circumferential face of the engaging hole. Therefore, the engaging shaft is in reliably contact with the inner circumferential face of the engaging hole in a locked state, an accidental operation of the operation member is prevented and the lock can be surely released in response to an unlocking operation of the operation member.

According to the invention, the operation member and the first tilting member are connected via the elastic member which is elastically deformable set between the inner face of the concave portion formed on either one member thereof and the outer face of the convex portion formed on the other member. Therefore, the operation member and the first tilting members of both the inside rail member and the outside rail member are connected so as to prevent them from rattling.

MODE FOR CARRYING OUT THE INVENTION

First Embodiment

Figure 1:
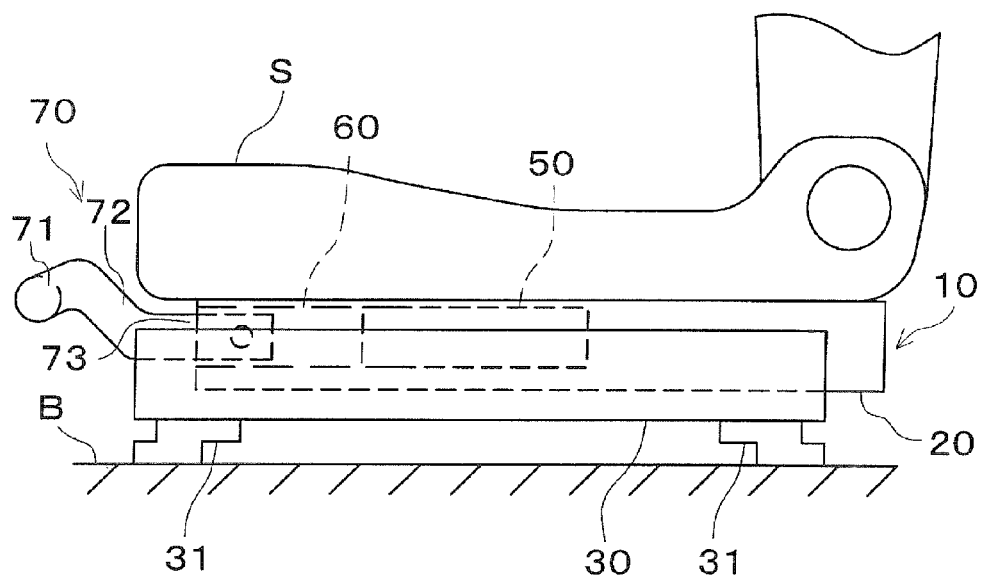
FIG. 1 is a side view showing the configuration outline of a vehicle seat to which a seat sliding device according to a First Embodiment of the present invention is installed.
Figure 2:
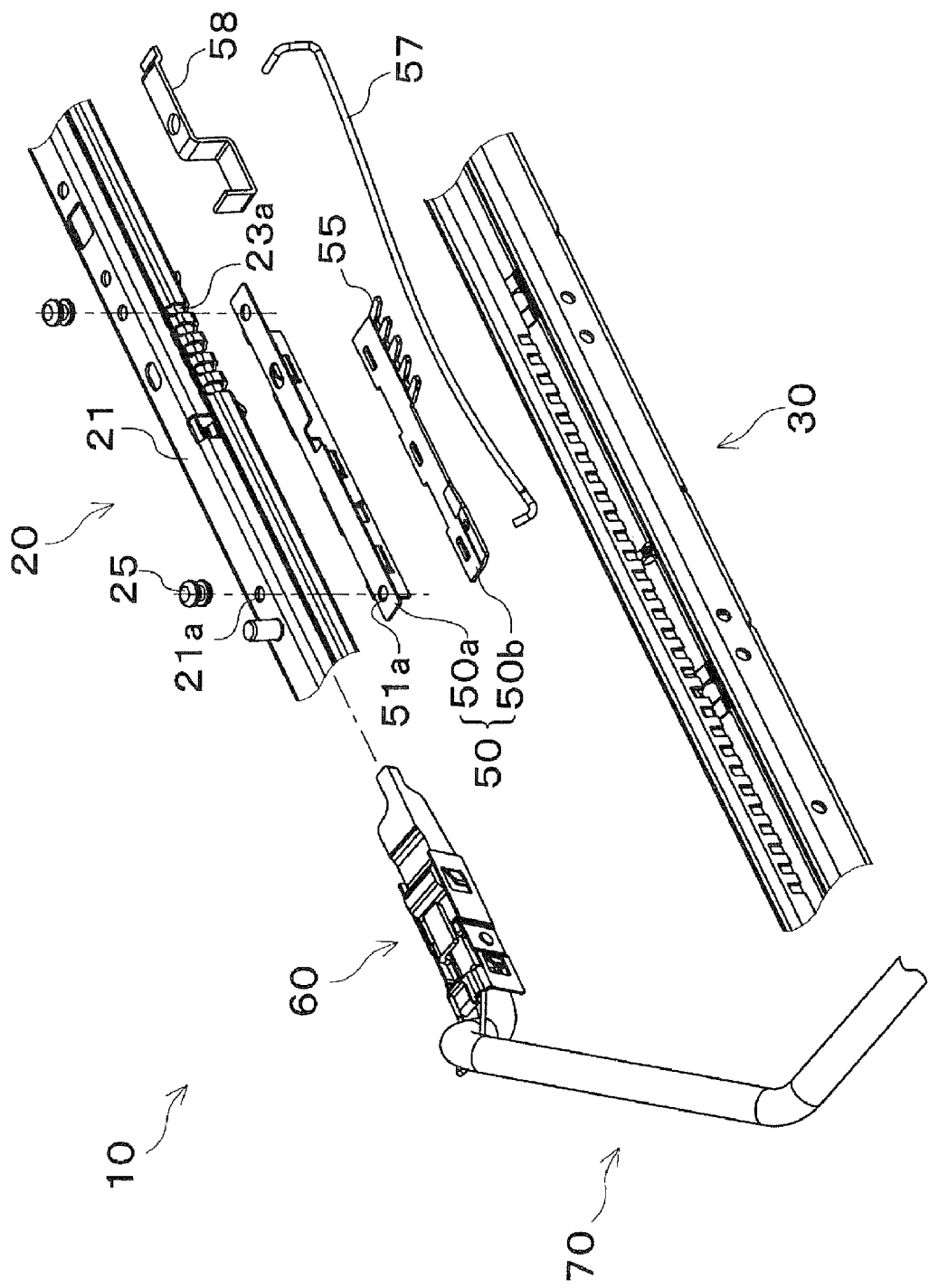
FIG. 2 is a partially exploded perspective view of the seat sliding device shown in FIG. 1.
Figure 3:
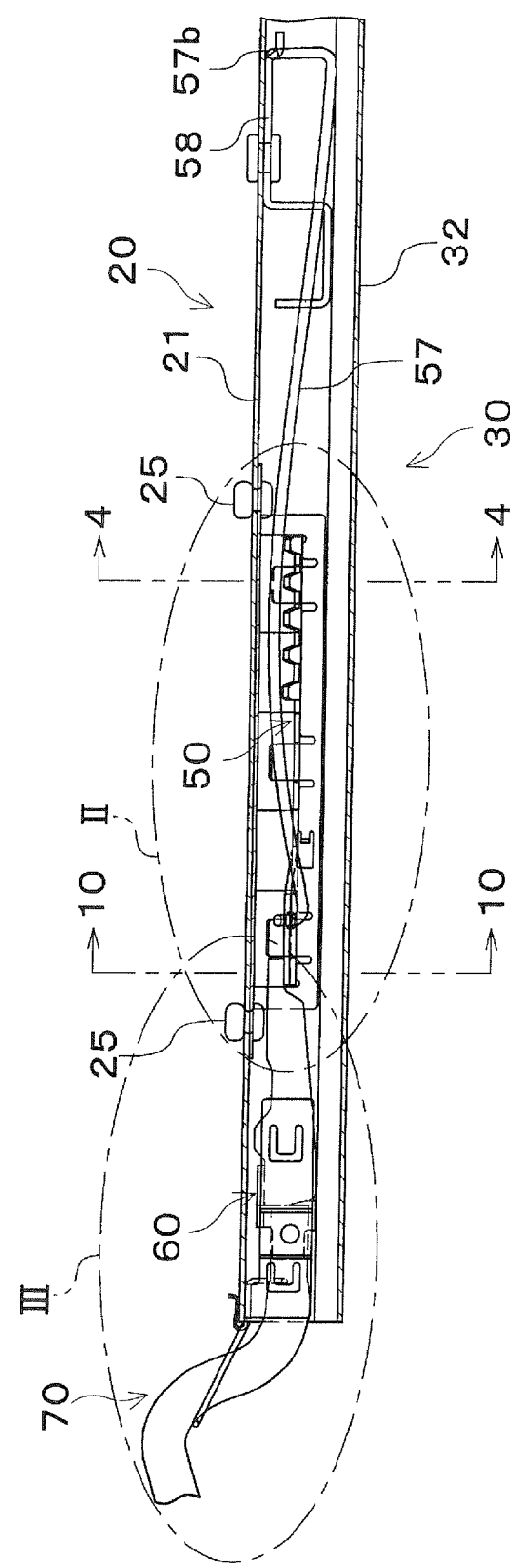
FIG. 3 is a cross-sectional view of the seat sliding device shown in FIG. 1.
Figure 4:
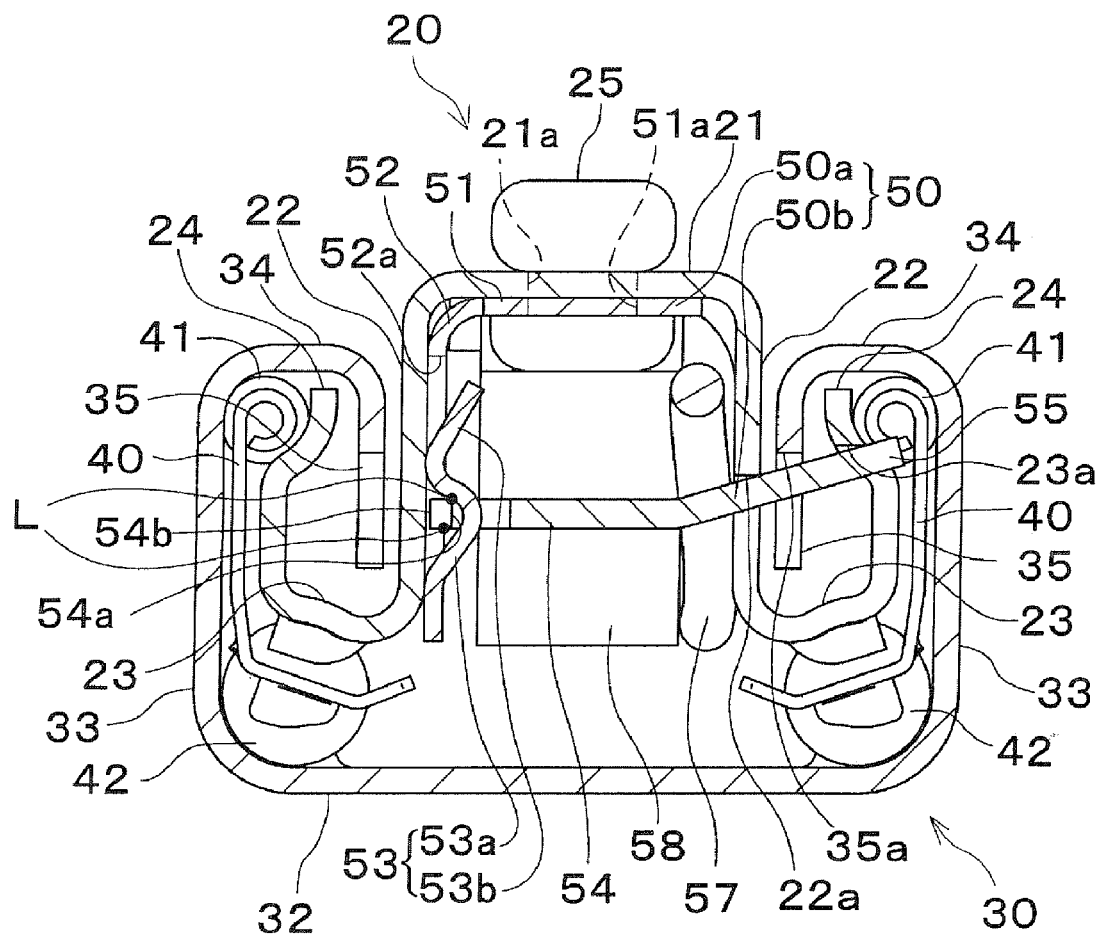
FIG. 4 is a cross-sectional view taken along the line 4-4 of FIG. 3.

Hereinafter, a First Embodiment of the present invention will be described with reference to the accompanying drawings. FIG. 1 is a side view showing the configuration outline of a vehicle seat S to which a seat sliding device 10 according to a First Embodiment of the present invention is installed. FIG. 2 is a partially exploded perspective view of the seat sliding device 10 shown in FIG. 1. FIG. 3 is a partially cross-sectional view of the seat sliding device 10 shown in FIG. 1. FIG. 4 is a cross-sectional view taken along the line 4-4 of FIG. 3.

As shown in FIGS. 1 to 3, the seat sliding device 10, in which a vehicle seat S is fixed to a vehicle floor B so that it can slide back and forth, mainly includes a pair of upper rails 20 fixed to the vehicle seat S, a pair of lower rails 30 fixed to the vehicle floor B via front and rear feet 31, a pair of lock members 50 which can be fixed (locked) so as not to allow a relative movement of the upper rails 20 and the lower rails 30, a pair of biasing members 60 which can bias the lock members 50 in the pivoting direction to unlock the lock members 50 in response to the operation of the operation lever 70 (only each one is shown in FIG. 1 and FIG. 2) and an operation lever 70 which is operated to switch between a locked state in which the upper rails 20 and the lower rails 30 are engaged by the pair of lock members and an unlocked state in which the locked state is released.

As shown in FIG. 4, the upper rail 20 includes a top wall 21 which is generally horizontal to the vehicle floor B and to which the vehicle seat S is mounted via a bracket or the like (not shown), side walls 22 vertically attached from both ends of the top wall 21, connecting portions 23 which upwardly bend from the lower end of each side wall 22, and tilted portions 24 which hold first steel balls 41 of retainers 40 in spaces formed between the tilted portions and the lower rail 30.

Notches 22a, 23a which engage with lock nails 55 (described later) of the lock member 50 are provided at five points each on one side wall 22 and the connecting portion 23 connecting to the side wall 22, respectively.

The lower rail 30 includes a bottom wall 32 which is generally horizontal to the vehicle floor 13, faces the top wall 21 of the upper rail 20 and is fixed to the vehicle floor B via front and rear feet 31, first side portions 33 upwardly extending from both ends of the bottom wall 32, collar portions 34 each of which extends from the upper end of each first side portion 33 toward the center in generally parallel with the bottom wall 32, and second side portions 35 each of which extends from the end of each of the collar portions 34 toward the bottom wall 32 in generally parallel with the first side portions 33.

On the second side portions 35 corresponding to the notches 22a of the side walls 22 and the notches 23a of the connecting portions 23, notches 35a formed in the same manner as the notches 22a, 23a are provided at five or more points.

The upper rail 20 is positioned so that the top wall 21 thereof faces the bottom wall 32 of the lower rail 30 and tilted portions 24 of the upper rail 20 get into each of the spaces formed between the first side portions 33 and the second side portions of the lower rail 30. First steel balls 41 of the retainers 40 are positioned between the corner portions, which are between the first side portions 33 and the collar portions 34 of the lower rail 30, and the tilted portions 24 of the upper rail 20. Second steel balls 42 of the retainers 40 are positioned between the corner portions, which are between the bottom wall 32 and the first side portions 33 of the lower rail 30, and the connecting portions 23 of the upper rail. The first steel balls 41 and the second steel balls 42 which are held by the retainers 40 allow the upper rail and the lower rail 30 to smoothly slide in the frontward and backward directions of the vehicle.

Figure 5:
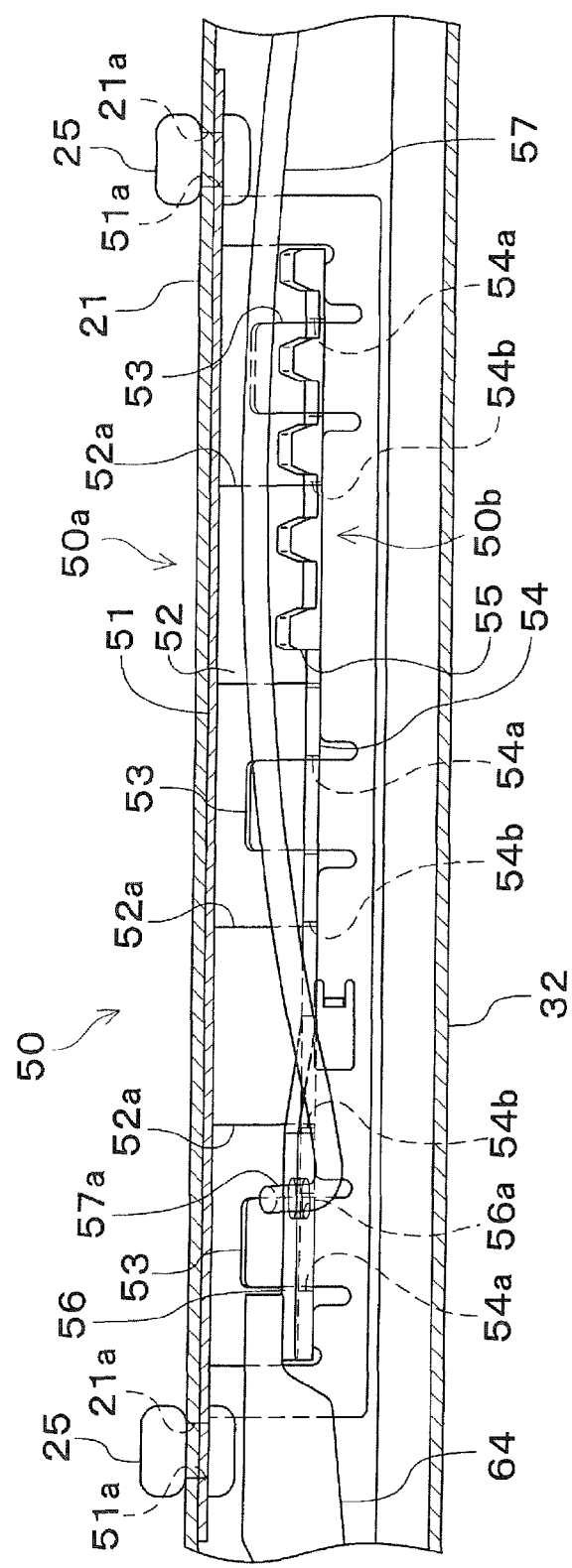
FIG. 5 is an enlarged view of the section within the ellipse II drawn by alternate long and short dashed lines shown in FIG. 3.
Figure 6:
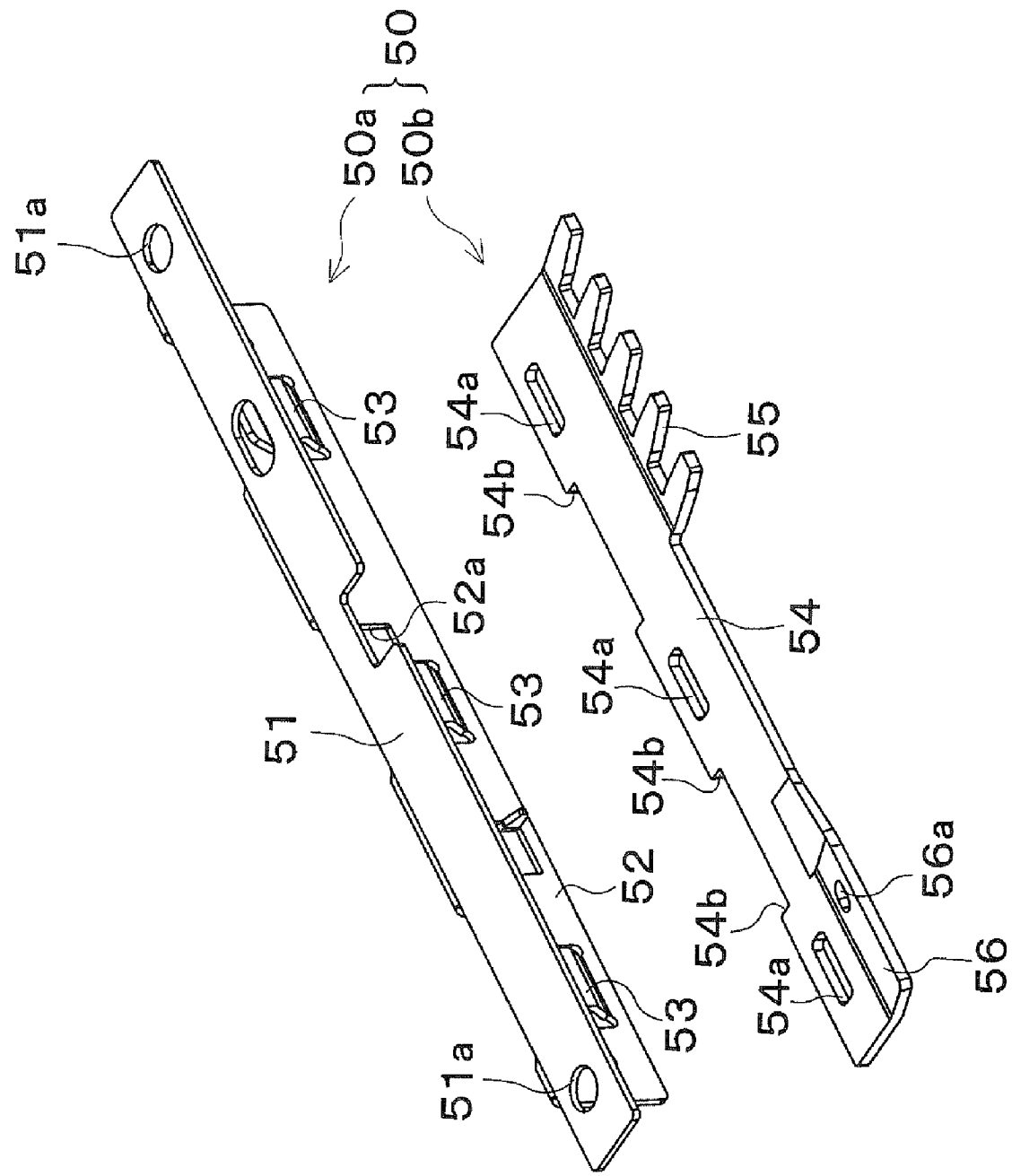
FIG. 6 is an exploded perspective view of the lock member shown in FIG. 5.

FIG. 5 is an enlarged view of the section within the ellipse II drawn by alternate long and short dashed lines shown in FIG. 3. FIG. 6 is an exploded perspective view of the lock member 50 shown in FIG. 5.

As shown in FIG. 5 and FIG. 6, the lock member 50 includes a lock bracket 50a and a pivoting member 50b. The lock bracket 50a is formed by a top board 51 provided with two circular holes 51a in the vicinity of both ends in the longitudinal direction and a side board 52 extending downward from one side end portion of the top board 51 and includes a generally L-shaped cross section.

The side board 52 includes three support pieces 53 arranged at substantially equal intervals in the longitudinal direction. Each of the support pieces 53 includes a support portion 53a which has a substantially C-shaped cross section (substantially inverted C-shaped cross section as seen from the direction facing the paper of FIG. 4) and is connected to the side board 52 at the lower end thereof and an extending portion 53b which extends from the upper end of the support portion 53a toward the upward slanting direction (see FIG. 4). In the upper vicinity of the side board 52 to which each of the support portions 53a is connected, an opening 52a which is wide open in the longitudinal direction is formed (see FIG. 5).

As shown in FIG. 6, the pivoting member 50b includes a plate-like body 54 and five lock nails 55 formed so as to project from the portion of one side in the longitudinal direction (the counter operation lever side) of the plate-like body 54 to the crosswise and upward slanting direction. On the plate-like body 54, three elongated holes 54a which are wide open in the longitudinal direction are provided with spacings on the opposite side of the crosswise direction of the lock nails 55 over the whole length in the longitudinal direction. Into each of the elongated holes 54a, the extending portion 53b and the support portion 53a of the corresponding support piece 53 can be inserted. The elongated hole 54a is formed so that the width in the breadth direction is larger than the thickness of the support portion 53 so as to allow the support piece 53 in an inserted state to make a relative pivoting.

On the plate-like body 54, protrusions 54b projecting anglewise in the direction distant from the lock nails 55 are provided in the vicinity of the respective elongated holes 54a. The width (dimension in the rail sliding direction) of each protrusion 54b is slightly smaller than that of each opening 52a of the side hoard 52 (see FIG. 5).

The side distant from the elongated hole 54a (lock nail side) on the other side (operation lever side) portion in the longitudinal direction of the plate-like body 54 is formed as a tilted portion 56 which is inclined upward. On the tilted portion 56, a through hole 56a is formed, in which one side end portion 57a of a lock spring 57 described later can be inserted.

As shown in FIG. 4, the pivoting member 50b configured as described above is engaged by inserting the support pieces 53 into corresponding elongated holes 54 and thereby pivotably supporting to a lock bracket 50a around the contact portion of the lower end of each protrusion 54b and the lower edge of each opening 52a or the contact portion of the upper edge of each elongated hole 54a and each support portion 53a which serves as a pivot center L. The pivot center L extends in the rail sliding direction. Therefore, in FIG. 4, the pivot center L is shown with dots because it extends in the direction perpendicular to the paper plane.

Each protrusion 54b of the pivoting member 50b is formed so that the width dimension thereof is slightly smaller than that of the corresponding opening 52a. Therefore, even in the case where the pivoting member 50b pivots around the pivot center L, the pivoting member 50b does not rattle in the longitudinal direction (rail sliding direction) (see FIG. 5). Further, at each elongated hole 54a, the pivoting member 50b is pivotably supported to the support portions 53a of the support pieces 53 of the lock bracket 50a, each support portion having a generally C-shaped cross section, thereby preventing the pivoting member 50b from coming off from the lock bracket 50a easily.

The lock member 50 configured as mentioned above is fixed to the upper rail 20 by crimping the both circular holes 51a of the top board 51 and the two circular holes 21a provided on the top wall 21 using a rivet 25, with the top board 51 and the side board 52 of the lock bracket 50a being in contact with the top wall 21 and the side board 22 of the upper rail 20. Into the through holes 56a of the pivoting member 50b, one side end portion 57a of the lock spring 57 formed by bending a metal bar which is an elastic body is inserted.

Therefore, the pivoting member 50b is biased by the lock spring 57 inserted to one side end portion 57a, in such a direction as to pivot around the pivot center L in the counterclockwise in FIG. 4, that is, in the direction where the lock nails 55 engage with the notches 22a, 23a of the upper rail 20 and the corresponding notches 35a of the lower rail 30 (lock pivoting direction). The lock spring 57 is fixed to the upper rail 20 at the other side end portion 57b by a fixture 58 formed by bending a flat plate.

Figure 7:
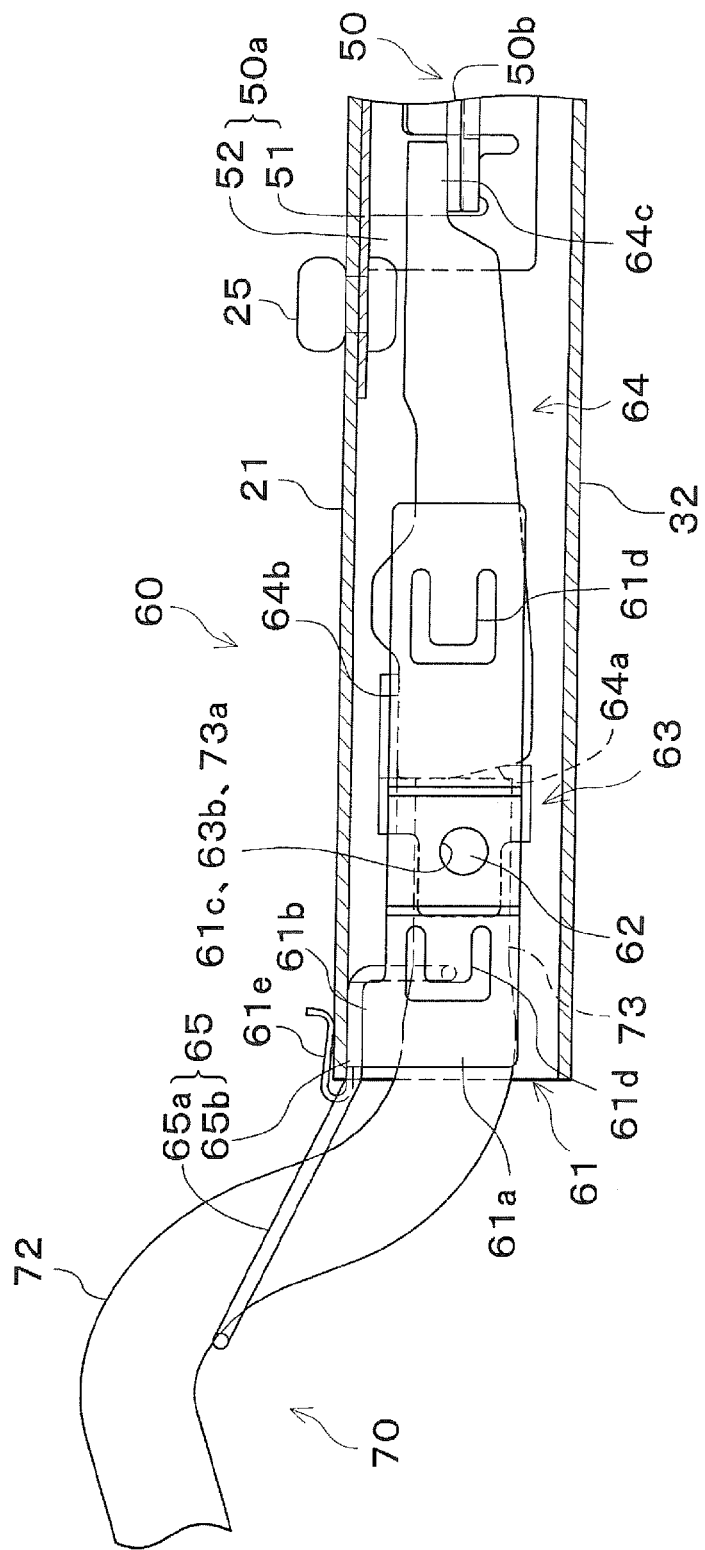
FIG. 7 is an enlarged view of the section of within the ellipse III drawn by alternate long and short dashed lines shown in FIG. 3.
Figure 8:
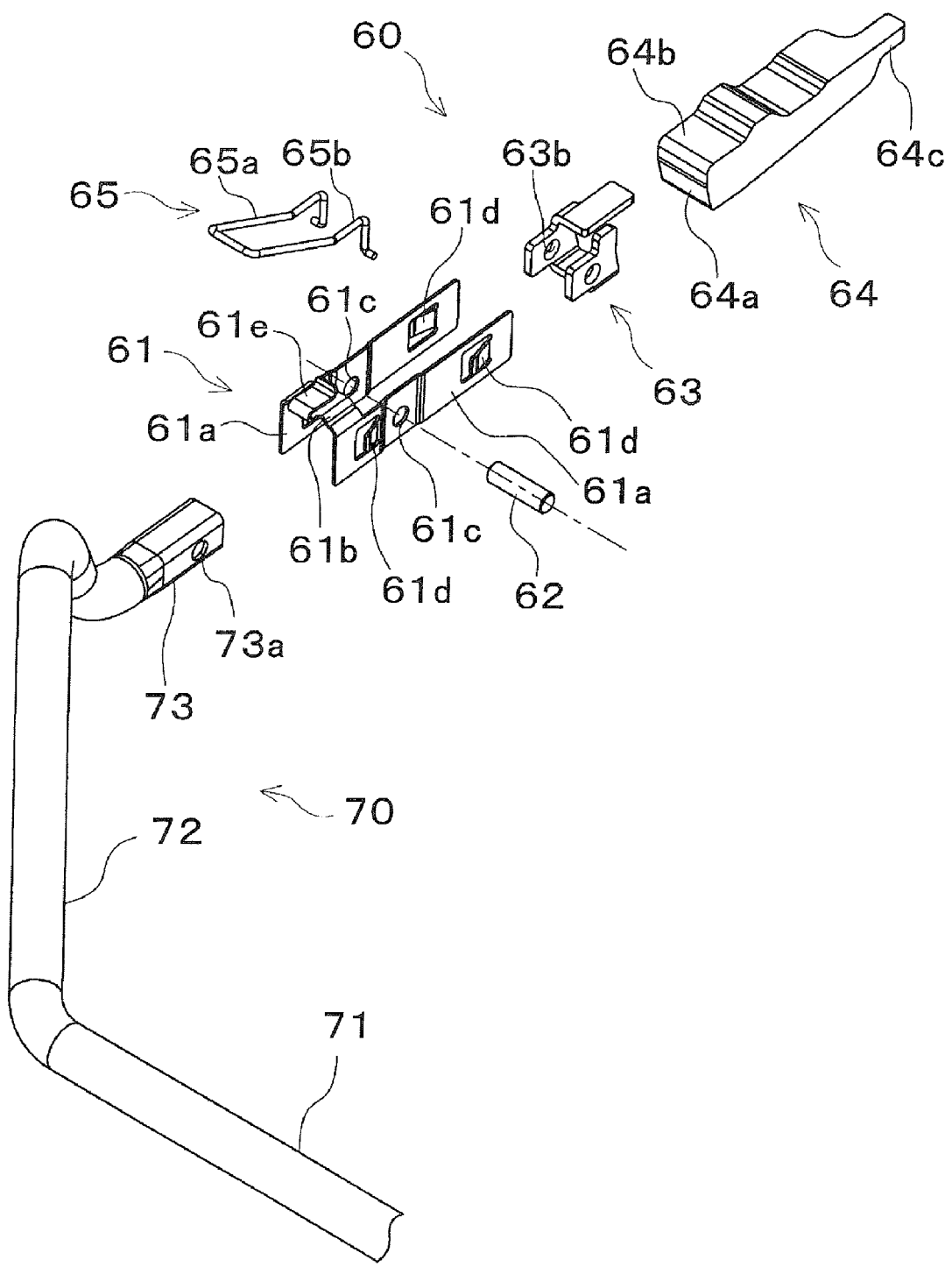
FIG. 8 is an exploded perspective view of the biasing member shown in FIG. 7.

FIG. 7 is an enlarged view of the section within the ellipse II drawn by alternate long and short dashed lines shown in FIG. 3. FIG. 8 is an exploded perspective view of the biasing member 60 shown in FIG. 7.

As shown in FIG. 7 and FIG. 8, the biasing member 60 includes a balancer support member 61 fixed to the upper rail 20, a shaft 62 press-fitted in both through holes 61c of the balancer support member 61 and fixed perpendicular to the rail sliding direction, a balancer bracket 63 tiltably supported to the shaft 62 at both through holes 63b thereof, a balancer 64 attached to the balancer bracket 63, and a generally clip-like elastic member 65 which prevents tilting in the direction opposite to the unlocking tilting direction (counter unlocking tilting direction) where the lock of the connecting portion 72 of the operation lever 70 is released.

The balancer support member 61 is formed with the upper end portions on the operation lever side of both side boards 61a being connected by the connecting portion 61b. On the both side boards 61a, through holes 61c are formed on the respective center parts. Notch pieces 61d are formed on both the operation lever side and the counter operation lever side of the through holes 61c. The notch pieces 61d are formed so as to prevent a movement relative to both side walls 22 of the balancer support member 61 in the operation lever side when they engage with the engaging parts (not shown) provided on the operation lever side of both side walls 22 of the upper rail 20.

On the connecting portion 61b, an elastic holding portion 61e having a substantially U-shaped cross section, which is open on the counter operation lever side. The height of the U-shaped cross section portion of the elastic holding portion 61e is slightly smaller than the thickness of the top wall 21 of the upper rail 20.

Figure 9:
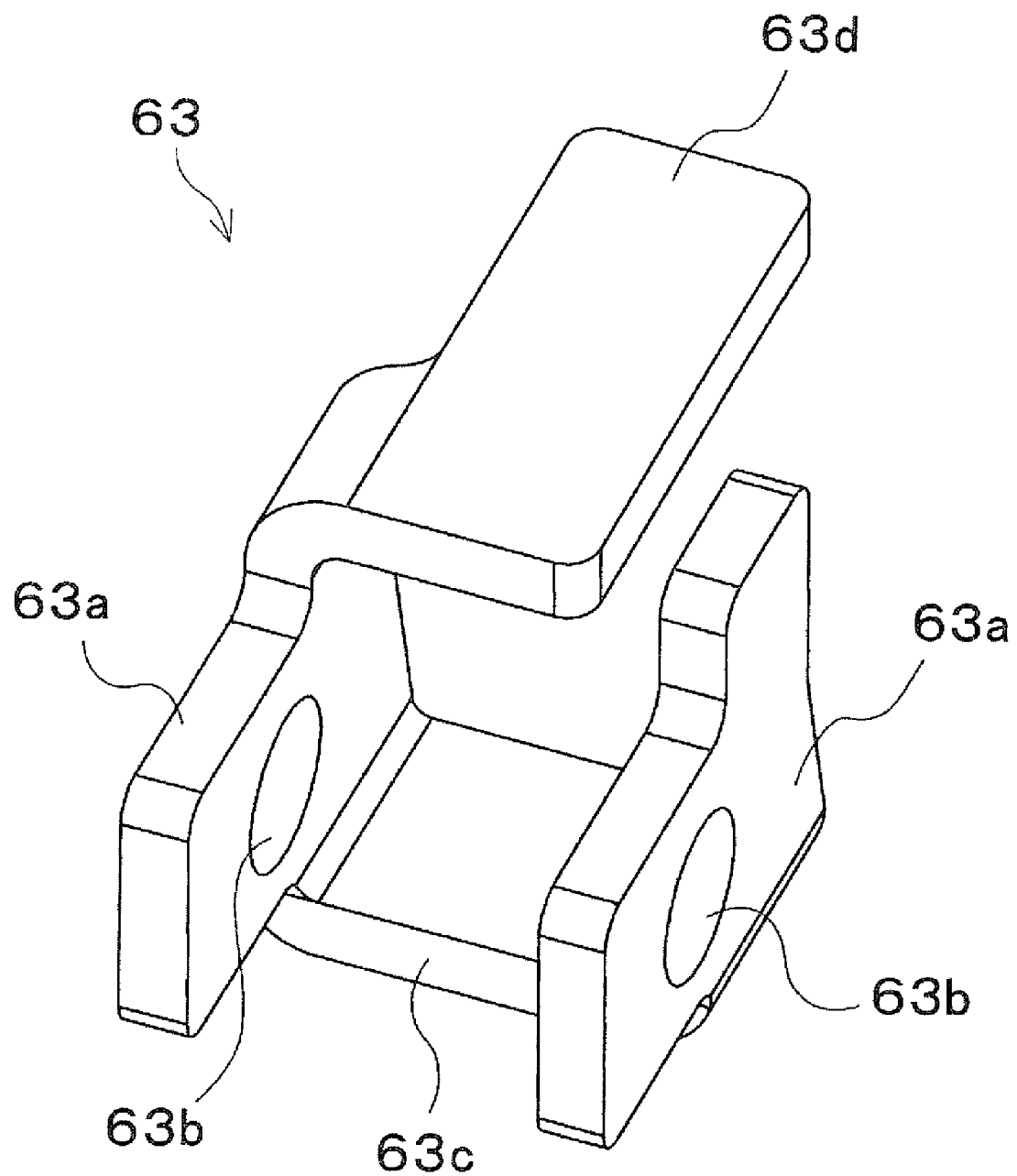
FIG. 9 is a detailed perspective view of a balancer bracket shown in FIG. 8.

FIG. 9 is an detailed perspective view of the balancer bracket 63.

As shown in FIG. 9, the balancer bracket 63 includes two side boards 63a each having a through hole 63b formed in the respective center portion thereof, and the both side boards 63a are connected by the connecting portion 63c from the center of through holes 63b toward the counter operation lever side at the bottom. The connecting portion 63c is formed so shat it can be brought in contact with the undersurface of the support portion 73 of the operation lever 70 when it is tilted in the unlocking tilting direction with the balancer bracket 63 and the operation lever 70 mounted on the shaft 62 as described later.

On the top end of one of the sideboards 63a on the counter operation lever side, a extending piece 63d is provided which projects toward the top end of the other sideboard 63a and the counter operation lever side. The extending piece 63d is formed with spacings from both through holes 63b toward the counter operation lever side so that it does not come in contact with the top face of the support portion 73 of the operation lever 70 when the balancer bracket 63 and the operation lever 70 are mounted on the shaft 62 and are tilted in the counter unlocking tilting direction.

The balancer 64 is attached at its end face 64a on the operation lever side and top face 64b to the both side boards 63a and the extending piece 63d of the balancer bracket 63 by welding or the like. On one part on the counter operation lever side of the balancer 64, a connecting piece 64c is formed in such a manner of projecting, which can contact the tilted portion 56 of the lock member 50 (see FIG. 7).

The balancer 64 includes a shape and mass, etc. adapted so as to bring a position of the center of gravity of the tilting body including the operation lever 70, which tilts around the shaft 62 by operation of the operation lever 70 and the biasing members 60 on both the right and left sides close to the shaft center of the shaft 62. The balancer 64 may have a shape and mass, etc. adapted to make the position of the center of gravity of the tilting body coincide with the center of the shaft 62. In the description of Claims, the term "vicinity" includes "coincidence."

The operation lever 70 includes a gripper 71 located outward of the upper rail 20, connecting portions 72 extending in parallel and in a substantially downcurved shape from the both ends of the gripper 71, and a support portion 73 which is connected to both connecting portions 72 and includes through holes 73a through which the shaft 62 can be inserted. (See FIG. 1 and FIG. 8.)

Assembly of the biasing member 60 and the operation lever 70, which are configured as mentioned above, to the upper rail 20 will be described below. First, with the shaft 62 being inserted through both through holes 63b of the balancer bracket 63 to which the balancer 64 is fixed and the both through holes 73a of the support portion 73, the shaft 62 is press-fitted into the both through holes 61c of the balancer support member 61 and secured. As a result, the balancer 64 and the operation lever 70 are supported around the shaft 62 as the tilting center to the balancer support member 61.

Next, as shown in FIG. 7, the U-shaped biasing member 65a of the elastic member 65 is latched to the connecting portion 72 of the operation lever 70. Both support portions 65b of the elastic member 65 are held between the upper face of the connecting portion 61b of the balancer support member 61 and the lower face of the top wall 21 of the upper rail 20, and the biasing member 60 is inserted in the upper rail 20. An elastic holding portion 61e of the connecting portion 61b of the balancer support member 61 is engaged with the top wall 21, and the notch pieces 61d of the connecting body support member 61 are engaged with the engaging part of both side walls 22.

Thus, the biasing member 60 and the operation lever 70 are assembled to the upper rail 20. At this time, the connecting portion 72 of the operation lever 70 is biased so that the U-shaped biasing portion 65a of the elastic member 65 prevents tilting in the counter unlocking tilting direction (see FIG. 7). The lower face of the connecting piece 64c of the balancer 64 is in contact with the upper face of the tilted portion 56 of the lock member 50 (see FIG. 7).

Figure 10:
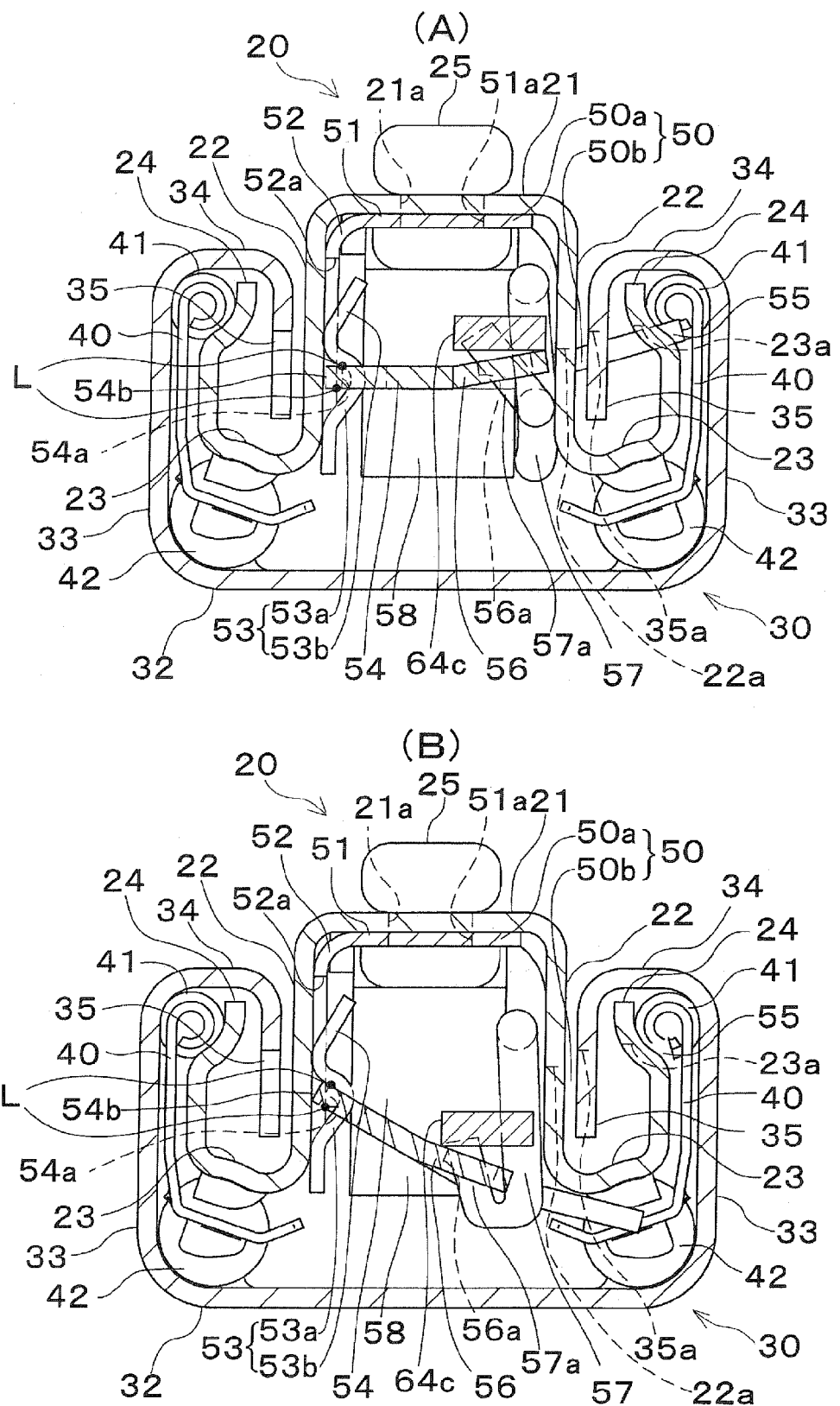
FIG. 10(A) is a cross-sectional view showing a locked state by the lock member, taken along the line 10-10 shown in FIG. 3.
FIG. 10(B) is a cross-sectional view showing an unlocked state by the lock member.

FIG. 10(A) is a cross-sectional view taken along the line 10-10 shown in FIG. 3, showing a locked state by the lock member 50; and FIG. 10(B) is a cross-sectional view showing; an unlocked state by the lock member 50.

In the seat sliding device 10 configured as mentioned above, when the gripper 71 of the operation lever 70 is not operated, the lock member 50 is biased around the pivot center L in the lock pivoting direction by the biasing force of the lock spring 57 and the lock nails 55 are kept engaged with the five notches among notches 22a, 23a of the upper rail 20 and the notches 35a of the lower rail 30.

As a result, the upper rail 20 and the lower rail 30 are locked so as not to make a relative movement (see FIG. 10(A)).

In such a locked state by the lock member 50, when the gripper 71 of the operation lever 70 is operated to move upward, the support portion 73 of the operation lever 70 tilts around the shaft 62. When the connecting portion 63c of the balancer bracket 63 is pressed downward by the support portion 73 which tilts as described above, the balancer bracket 63 tilts around the shaft 62 in the direction in which the extending piece 63d is moved downward (unlocking tilting direction).

When the tilted portion 56 of the lock member 50 is biased downward by the connecting piece 64c of the balancer 64 fixed to the balancer bracket 63 which tilts as described above, the pivoting member 50b tilts around the pivot center L in a clockwise direction (unlocking pivoting direction) in FIG. 10(B). As a result, the engagement of lock nails 55, notches 22a, 23a of the upper rail 20 and notches 35a of the lower rail 30 is released to put the upper rail 20 and the lower rail 30 in an unlocked state where they can make a relative movement.

At this time, On the pivoting member 50b, the elongated holes 54a and the lock nails 55 which constitute the pivot center L are formed so that they are spaced from each other. Therefore, compared to the case where the elongated holes 54a and the lock nails 55 are positioned close to each other, the downward moving distance of the tilted portion 56 of the pivoting member 50b which moves in response to the operation of the operation lever 70 becomes larger.

The tilted portion 56 formed distant from the elongated holes 54a is biased to the connecting piece 64c of the balancer 64, whereby the pivoting member 50b pivots around the pivot center L from a locked state (FIG. 10(A)) to an unlocked state (FIG. 10(B)). Therefore, compared to the case where the part in the vicinity of the elongated hole 54a is biased, the downward moving distance of the tilted portion 56 of the pivoting member 50b which moves in response to the operation of the operation lever 70 is increased.

Thus, the downward moving distance of the tilted portion 56 of the pivoting member 50b is increased, thereby increasing the inclined angle of the balancer 64 which tilts around the shaft 62 in an unlocked state. As a result, the tilting angle of the support portion 73 which tilts around the shaft 62 in an unlocked state, that is, the upward moving distance of the gripper 71 is increased, and a large operation stroke is required for an unlocking operation.

Then, after a relative position of the upper rail 20 and the lower rail 30 is adjusted, the gripper 71 of the operation lever 70 is moved downward back to its original position, the biasing of to the pivoting member 50b by the connecting piece 64c of the balancer 64 is released and the pivoting member 50b tilts around the pivot center L in the lock pivoting direction by a biasing force of the lock spring 57. The lock nails 55 engage with five notches among the notches 22a, 23a of the upper rail 20 and the notches 35a of the lower rail 30, and the upper rail 20 and lower rail 30 are locked again so as not to make a relative movement (see FIG. 10(A)).

In such a locked state, when a passenger accidentally touches the gripper 71 of the operation lever 70 and moves it in the unlocking tilting direction in the event of a collision of the car, etc., accidental operation for unlocking of the operation lever 70 can be prevented by the following reasons. In other words, the center of gravity of the tilting body including the operation lever 70 and the biasing members 60 on both the right and left sides is positioned in the vicinity of the center of the shaft 62, and a force applied in response to the tilting motion of the operation lever 70 when the lock member 50 is unlocked is smaller, compared to the case where the center of gravity of the tilting body is positioned distant from the tilting center. Therefore, the lock is not unlocked easily, thereby preventing accidental operation of the operation lever 70 due to a contact, etc. irrespective of a passenger's intention. The tilting angle of the tilting body 50b required for unlocking is increased, thereby requiring a large operation stroke for an unlocking operation.

In such a locked state, when a tension to the fixtures of the seat belt is generated in the event of a collision of the car, etc., the counter operation lever side of the upper rail 20 and the lower rail 30 in the interior of the vehicle (hereinafter referred to as the inside rails 20, 30) moves upward, while the upper rail 20 and the lower rail 30 in the outside of the vehicle (hereinafter referred to also as the outside rails 20, 30) do not move.

When only the counter operation lever side of the inside rails 20, 30 moves upward as described above, the inside rails 20, 30 tilt so that the operation lever side moves downward. In the case where the operation lever tilts around the shaft 62 as the tilting center, with the support portion 73 of the operation lever 70 and the balancer bracket 63 of the biasing member 60 being secured, the gripper on the outside rail side cannot be moved in the counter unlocking direction and the operation lever 70 keeps its original position (in a horizontal state). As a result, the operation lever 70 moves in the unlocking direction relative to the tilted inside rails 20, 30 and the inside rails 20, 30 are unlocked irrespective of a passenger's intention.

In the First Embodiment, the extending piece 63d of the balancer bracket 63 supported tiltably to the shaft 62 is formed so as not to come in contact with the top face of the support portion 73 of the operation lever 70. Therefore, even if the biasing member 60 tilts from the locked state to the counter unlocking tilting direction, the support portion 73 does not tilt in response to the tilting motion. Therefore, even if the inside rails 20, 30 tilt in response to the tension generated at the seat belt fixtures as described above, the connecting portion 72 of the operation lever 70 does not tilt in the counter unlock tilting direction.

As explained above, the seat sliding device 10 according to the First Embodiment includes a biasing member 60 which biases the lock member 50 in the unlocking pivoting direction in response to the operation of the operation lever 70 and which can tilt around the shaft 62 as the tilting center together with the operation lever 70 in response to the operation of the operation lever 70. The balancer 64 of the biasing member 60 has a shape and mass, etc. adapted so as to bring a position of the center of gravity of the tilting body including the operation lever 70 and the biasing member 60, which tilt around the shaft 62 as the tilting center by operation of the operation lever 70, close to the center of the shaft 62.

With this configuration, the center of gravity of the tilting body including the operation lever 70 and the biasing members 60 is positioned in the vicinity of the center of the shaft 62, and a force generated in response to the tilting motion of the operation lever 70 when the lock member 50 is unlocked is reduced, the lock member 50 is not easily unlocked and accidental operation of the operation lever 70 can be prevented.

In addition, by adjusting the position of the center of gravity of the balancer 64, the position of the tilting body can be adjusted. Therefore, the adjustment work for bringing the center of gravity of the tilting body close to the vicinity of the center of the shaft 62 can be performed easily.

Therefore, accidental operation of the operation lever 70 can be prevented.

In the seat sliding device 10 according to the First Embodiment, the balancer bracket 63 of the biasing member 60 includes a connecting portion 63c which can contact the support portion 73 of the operation lever 70 which tilts around the shaft 62 from a locked state to the unlocking tilting direction. The extending piece 63d of the balancer bracket 63 is formed distant from the both through holes 63b toward the counter operation lever side so that it does not contact the support portion 73 of the operation 70 which tilts around the shaft 62 from the locked state to the counter unlock tilting direction.

Therefore, even if the biasing member 60 of the inside rails 20, 30 tilts from the locked state to the counter unlocking tilting direction in response to the tension generated at the seat belt fixtures as described above, the connecting portion 73 does not tilt. On the other hand, the balancer bracket 63 of she biasing member 60 includes a connecting portion 63c formed, which can contact the support portion 73 which tilts in the unlocking tilting direction, and tilting motion of the operation lever 70 in the unlocking tilting direction can be transmitted to the lock member 50 via the biasing member 60.

Therefore, such an accidental operation of the operation lever 70 caused by an impact force as described above chat can lead to an unlocking of the outside rails 20,30 can be prevented.

Second Embodiment

Figure 11:
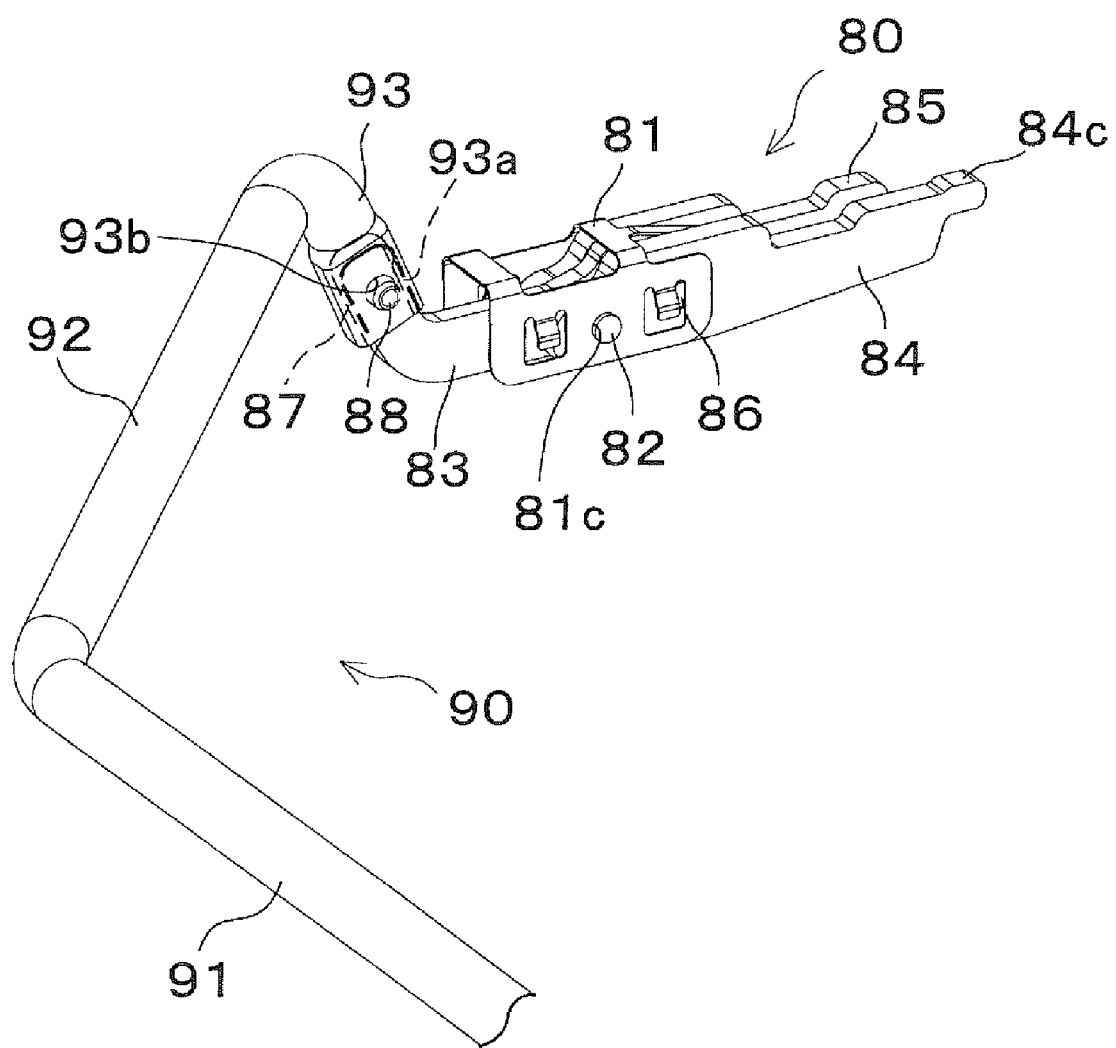
FIG. 11 is a perspective view showing the main part of the seat sliding device according to the Second Embodiment of the present invention.
Figure 12:
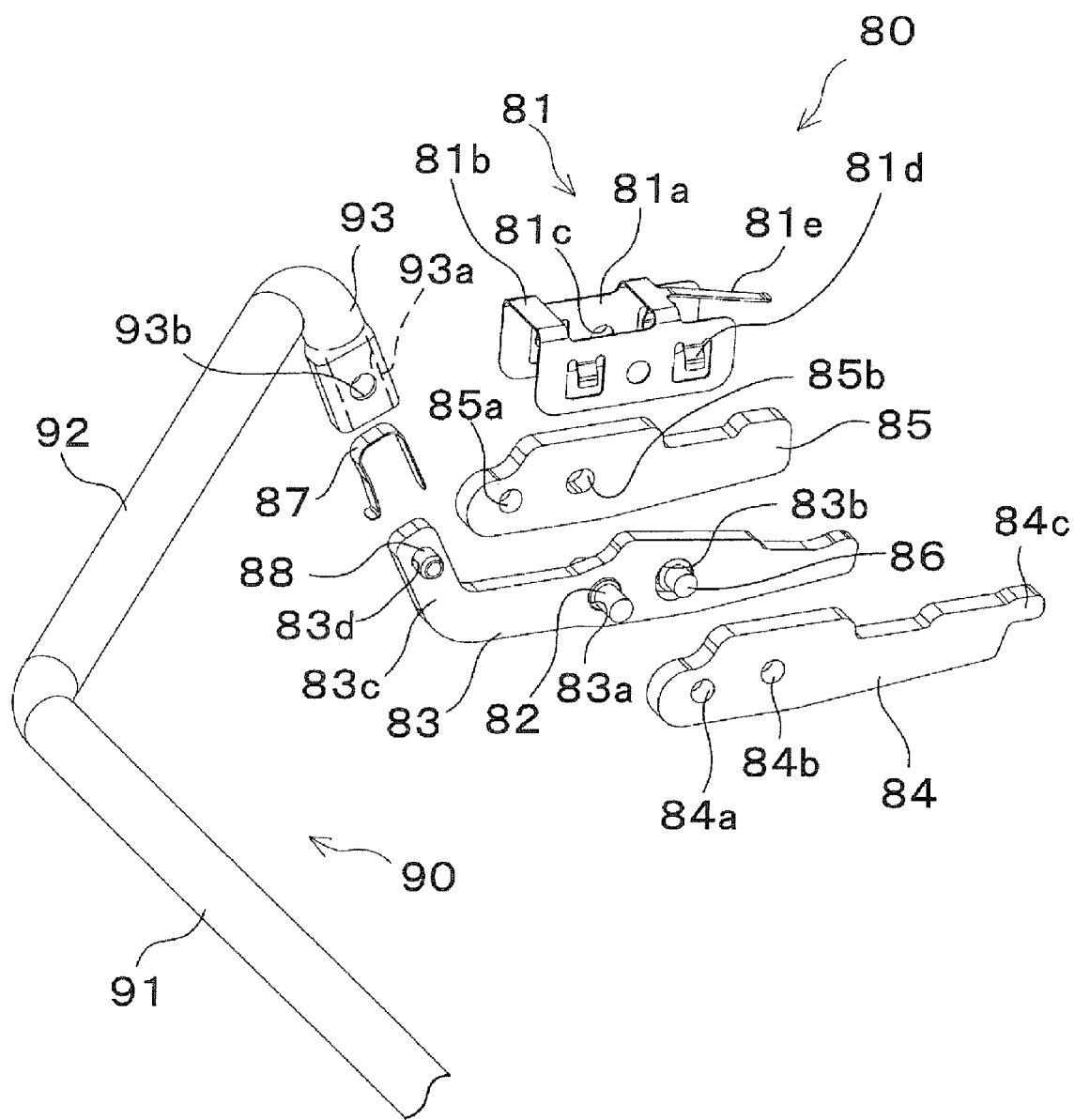
FIG. 12 is an exploded perspective view of the biasing member shown in FIG. 11.
Figure 13:
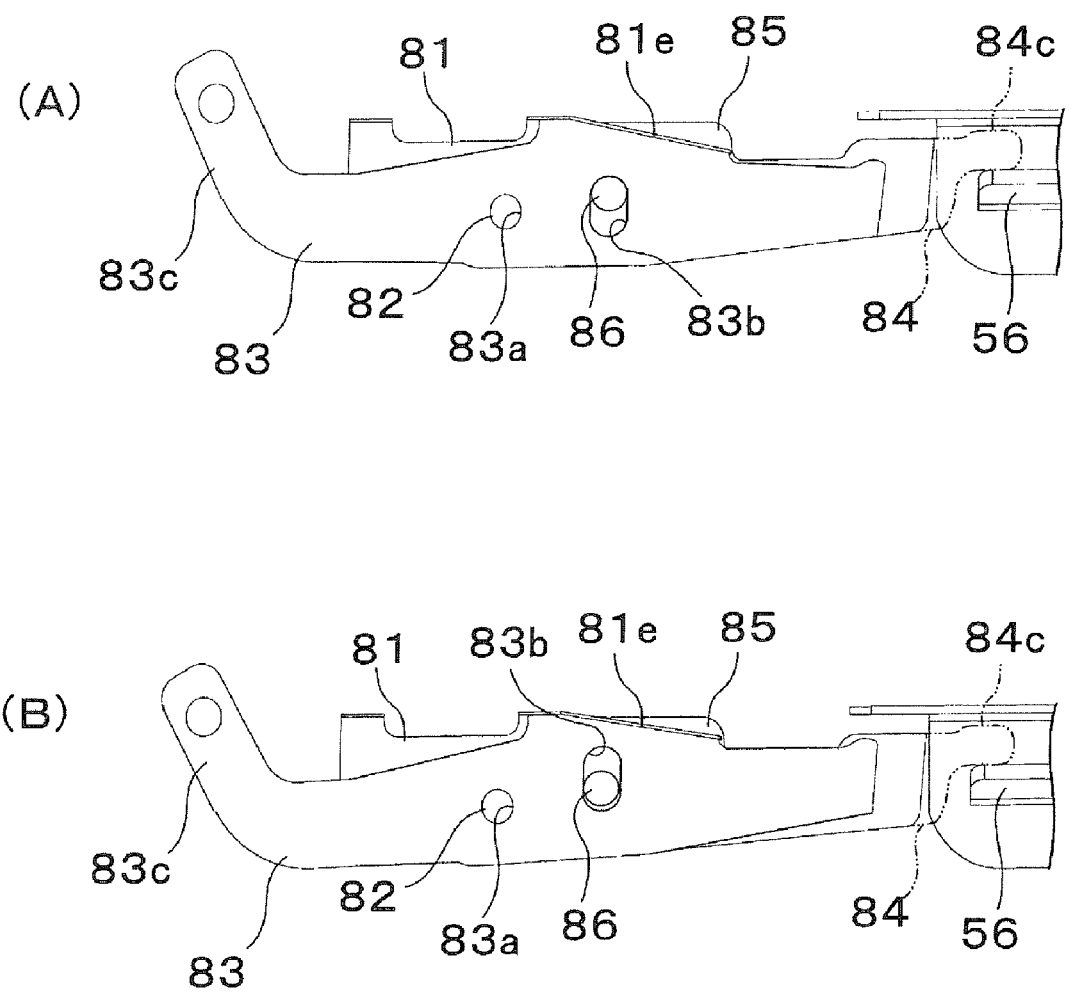
FIG. 13(A) shows the biasing member in a locked state.
FIG. 13(B) shows the biasing member which tilts from the locked state to the counter unlocking direction.

Next, a Second Embodiment of the present invention will be described with reference to FIG. 11 to FIG. 13. FIG. 11 is a perspective view showing the main part of the seat sliding device 10 according to the Second Embodiment of the present invention. FIG. 12 is an exploded perspective view of the biasing member 80 shown in FIG. 11.

FIG. 13(A) shows the biasing member 80 in a locked state, and FIG. 13(B) shows the biasing member 80 which tilts from the locked state to the counter unlocking direction.

FIGS. 13(A) and 13(B) show only a part of the balancer 84 with chain double-dashed lines and the cross section of the balancer support member 81 in order to explain the tilting state of the tilting member 83.

The seat sliding device 10 according to the Second Embodiment is different from the seat sliding device according to the First Embodiment in that a biasing member 80 and an operation lever 90 are adopted in place of the biasing member 60 and the operation lever 70 described in the above First Embodiment. Therefore, to the substantially same components as those of the seat sliding device of the First Embodiment, the same reference numbers are assigned and the explanation thereof is omitted.

As shown in FIG. 11 and FIG. 12, the biasing member 80 includes a balancer support member 81 fixed to the upper rail 20, a first shaft 82 press-fitted in the both through holes 81c of the balancer support member 81 and fixed perpendicular to the rail sliding direction, a tilting member 83 and two balancers 84, 85 tiltably supported relative to the first shaft 82, a second shaft 86 fitting into the through holes 84b, 85b of the both balancers, and a spring 87.

The balancer support member 81 is formed with the upper ends of the both side boards 81a being connected by two connecting portions 81b. On each of the both side boards 81a, a through hole 81c is formed on the center part. Notch pieces 81d are formed on both sides of the operation lever and the counter operation lever side of the through hole 81c. The notch pieces 81d are formed so as to engage with the engaging parts (not shown) provided on the operation lever side of the both side walls 22 by installing them so as to push up the balancer support member 81 from below against the upper rail 20. In the middle of the connecting portion 81b of the counter operation lever side, the biasing piece 81e which tilts downward on the counter operation lever side is provided.

The tilting member 83 is tiltably supported relative to the first shaft 82 by the through hole 83a formed on the center part. On the tilting member 83, the elongated hole 83b is provided, which is formed lengthy in the vertical direction on the counter operation lever side of the through hole 83a. In the elongated hole 83b, a second shaft 86 is engaged so as to allow a relative movement to the elongated hole 83b in the generally vertical direction. The breadth of the elongated hole 83b is set so as to be larger than the outside diameter of the second shaft 86.

The operation lever side of the tilting member 83 projects so as to tilt upward and constitutes the connecting portion 83c which is a part connecting to the operation lever 90. In the vicinity of the tip of the connecting portion 83c, a through hole 83d through which the third shaft 88 can be inserted is formed.

On the balancer 84, two through holes 84a, 84b are formed. The balancer 84 is tiltably supported relative to the first shaft 82 by the through hole 84a on the operation lever side. In the through hole 84b, one side end portion of the second shaft 86, which engages with the elongated hole 83b so as to allow a relative movement thereto, is inserted and secured so as not to allow a relative movement. On one part of the counter operation lever side of the balancer 84, the connecting piece 84c which can contact the tilted portion 56 of the lock member 50 is formed in a projecting manner.

The balancer 85 includes two through holes 85a, 85b formed. The balancer 85 is tiltably supported relative to the first shaft 82 by the through hole 85a of the operation lever side. In the through hole 85b, the other side end portion of the second shaft 86, which engages with the elongated hole 83b so as to allow a relative movement thereto, is inserted and secured thereto so as not to allow a relative movement.

The both balancers 84, 85 have a shape and mass, etc. adapted so as to bring a position of the center of gravity of the tilting body including the operation lever 90 and the biasing members 80 on both right and left sides, which tilts around the first shaft 82 by operation of the operation lever 90, close to the shaft center of the first shaft 82. The balancers may have a shape and mass, etc. adapted to make the position of the center of gravity the tilting body coincide with the center of the first shaft 82.

The spring 87 is formed by bending a plate-like elastic member into a U-shape. The spring 87 is interposed between the outer face of the connecting portion 83c of the tilting member 83 and the inner face of a concave portion 93a of the support portion 93 of the operation lever 90 and serves to connect the operation lever 90 and the tilting members 83 on both the inside rail and the outside rail, preventing rattling.

The operation lever 90 includes a gripper 91 disposed outward of the upper rail 20, connecting portions 92 extending in parallel with and in a substantially downcurved shape from the both ends of the gripper 91, and a support portion 93 which is connected to the both connecting portions 92 and the tilting member 83 of the biasing member 80.

At the end of the support portion 93, a concave portion 93a, with which the connecting portion 83c having a spring 87 fitted in the outer face can be fitted, is formed, and a through hole 93b through which a third shaft 88 can be inserted is formed.

Assembly of the biasing member 80 and the operation lever 90, which are configured as mentioned above, to the upper rail 20 will be described below. First, the first shaft 82 is inserted into the through hole 83a of the tilting member 83 and the through holes 84a, 85a of the both balancers 84, 85, and one side end portion and the other side end portion of the second shaft 86 which is movably engaged relative to the elongated hole 83b of the tilting member 83 in the vertical direction are inserted into the through holes 84b, 85b of the both balancers 84, 85. In this way the first shaft 82, through which the tilting member 83 and the both balancers 84, 85 are inserted so as to allow relative movement, is press-fitted in the both through holes 81c of the balancer support member 81 and secured.

Next, after the spring 87 engages with the outer face of the connecting portion 83c of the tilting member 83, the spring 87 and the connecting portion 83c are fitted into the concave portion 93a of the support portion 93.

As a result, the spring 87 is interposed between the inner face of the concave portion 93a of the support portion 93 and the outer face of the connecting portion 83c of the tilting member 83. Then, by inserting the third shaft 88 through the through hole 93b and the through hole 83d, the tilting member 83, both balancers 84, 85 and the operation lever 90 are supported by the balancer support member 81 around the first shaft 82 as the tilting center.

By engaging the notch piece 81d of the balancer support member 81 with the engaging part of both side walls 22 of the upper rail 20, the biasing member 80 and the operation lever 90 are assembled to the upper rail 20.

At this time, the biasing piece 81e of the balancer support member 81 contacts the top end of the counter operation lever side of the tilting member 83, whereby the tilting member 83 is biased in the generally downward direction (in the unlocking tilting direction around the second shaft 86). As a result, the tilting member 83 is biased by the biasing piece 81e so that the inner circumferential face of the upper portion of the elongated hole 83b contacts the second shaft 86.

In the seat sliding device 10 configured as mentioned above, when the gripper 91 of the operation lever 90 is not operated, the lock member 50 is biased around the pivot center L in the lock pivoting direction by the biasing force of the lock spring 57 and the lock nails 55 are kept engaged with five notches among notches 22a, 23a of the upper rail 20 and the notches 35a of the lower rail 30, in the same way as the first embodiment. As a result, the upper rail 20 and the lower rail 30 are locked so as not to make a relative movement.

In such a locked state by the lock member 50, when the gripper 91 of the operation lever 90 is operated to move upward, the support portion 93 and the tilting member 83 tilt around the first shaft 82 in the unlocking tilting direction.

At this time, as shown in FIG. 13(A) the second shaft 86 which contacts the inner circumferential face of the elongated hole 83b of the tilting member 83 moves in the generally downward direction in response to the tilting motion of the tilting member 83. With this movement of the second shaft 86, the balancers 84, 85, having one side end portion and the other side end portion of the second shaft 86 inserted into the through holes 84b, 85b, tilt around the first shaft 82 in the unlocking tilting direction.

When the inclined portion 56 of the lock member 50 is biased downward by the connecting piece 84c of the balancer 84 tilting as mentioned above, the pivoting member 50b pivots around the pivot center L the unlocking pivoting direction. As a result, the engagement of lock nails 55, notches 22a, 23a of the upper rail 20 and notches 35a of the lower rail 30 is released to put the upper rail 20 and the lower rail 30 in an unlocked state where they can make a relative movement.

Then, after a relative position of the upper rail 20 and the lower rail 30 is adjusted, the gripper 91 of the operation lever 90 is moved downward back to its original position, the biasing against the pivoting member 50b by the connecting piece 84c of the balancer 84 is released and the pivoting member 50b tilts around the pivot center L in the lock pivoting direction by a biasing force of the lock spring 57. As a result, the lock nails 55 engage with any five notches among the notches 22a, 23a of the upper rail 20 and the notches 35a of the lower rail 30, and the upper rail 20 and the lower rail 30 are locked again so as not to make a relative movement.

As described in the above First Embodiment, when only the counter operation lever side of the inside rails 20, 30 moves upward due to a collision of the car, etc., the inside rails 20, 30 tilt so that the operation lever side moves downward. At this time, in the Second Embodiment, the balancer 84 which biases the lock member 50 tilts around the first shaft 82 relative to the tilting member 83 in the counter unlocking tilting direction. As a result, the second shaft 86 having one side end portion secured to the balancer 84 moves around the first shaft 82 relative to the elongated hole 83b without contacting the inner circumferential face of the elongated hole 83b (see FIG. 13(B)). Therefore, the tilting member 83 and the operation lever 90 do not tilt in response to the tilting motion of the balancer 84 in the counter unlocking tilting direction. As a result, even if the inside rails 20, 30 tilt in response to the tension produced at the seat belt fixtures as described above, the connecting portion 92 of the operation lever 90 does not tilt in the counter unlocking tilting direction.

As explained above, in the seat sliding device 10 according to the Second Embodiment, the biasing member 80 includes a tilting member 83 which tilts around the first shaft 82 in response to the operation of the operation lever 90 and a balancer 84 which is supported tiltably around the first shaft 82 and can bias the lock member 50 in the unlocking direction. The tilting member 83 includes an elongated hole 83b formed lengthy in the vertical direction. The second shaft 86, which engages so as to allow a relative movement with the elongated hole 83b around the first shaft 82 in circumferential direction, is secured to the balancer 84. When the tilting member 83 tilts from the locked state to the unlocking direction, the second shaft 86 contacts the inner circumferential face of the upper portion of the elongated hole 83b of the second shaft 86, whereby the balancer 84 tilts together with the tilting member 83 in the unlocking direction and biases the lock member 50 in the unlocking direction. The position of the center of gravity of the balancer 84 and the balancer 85 is adjusted so as to bring the position of the center of gravity of the tilting body, which includes the operation lever 90 and the biasing member 80, close to the center of the first shaft 82.

Therefore, when the tilting member 83 tilts from the locked state to the unlocking direction by operation of the operation lever 90, the second shaft 86 contacts the inner circumferential face of the upper portion of the elongated hole 83b of the second shaft 86, whereby the balancer 84 tilts around the first shaft 82 in the unlocking direction in response to the tilting motion of the tilting member 83. The lock member 50 is biased in the unlocking direction in response to the tilting motion of the tilting member 84. Therefore, the locked state can be released reliably in response to the operation of the operation lever 90.

On the other hand, when only the counter operation lever side of the inside rails 20, 30 moves upward as described above, the balancer 84 which biases the lock member 50 of the inside rails 20, 30 tilts around the first shaft 82 from the locked state to the counter unlocking direction. As a result, the second shaft 86 fixed no the balancer 84 moves around the first shaft 82 relative to the elongated hole 83b without contacting the inner circumferential face of the elongated hole 83b. Therefore, the tilting member 83 and the operation lever 90 do not tilt in response to the tilting motion of the balancer 84 in the counter unlocking tilting direction.

In this way, too, such an accidental operation of the operation lever 90 caused by an impact force as described above that can lead to an unlocking of the outside rails 20, 30 can be prevented.

In the seat sliding device 10 according to the Second Embodiment, the biasing member 80 includes a biasing piece 81e which biases the tilting member 83 in the unlocking direction by such a biasing force that does not unlock the lock member 50. Thus, since the tilting member 83 is biased by the biasing piece 81e in the unlocking direction by such a biasing force that the lock member 50 is not unlocked, the tilting member 83 tilts in the unlocking direction until the second shaft 86 comes in contact with the inner circumferential face of the engaging hole 83b. Thus, since the second shaft 86 is in reliably contact with the inner circumferential face of the elongated hole 83 in a locked state, accidental operation of the operation lever 90 is prevented and the lock can be surely released in response to the unlock operation of the operation lever 90.

In the seat sliding device 10 according to the Second Embodiment, the operation lever 90 and the tilting member 83 are connected, via the spring 87 which can elastically deformable, between the inner face of the concave portion 93a of the support portion 93 and the outer face of the connecting portion 83c. Therefore, the operation lever 90 and the tilting members 83 of both the inside rail and the outside rail are connected so as to prevent them from rattling.

The present invention is not limited to the above embodiments, and it may be embodied as described below. Even in the cases below, the same actions or effects as the above embodiments are obtained.

(1) The balancer bracket 63 and the balancer 64 of the biasing member 60 may not be separate bodies, and the balancer bracket 63 and the balancer 64 may be integrally formed.

(2) The balancer bracket 63, from which the extending piece 63d is eliminated, may be attached at the both side boards 63a to the end face 64a of the balancer 64 by welding or the like.

(3) The pivoting member 50b of the lock member 50 is not limited to being pivotably supported to the lock bracket 50a around the pivot center L by inserting the support pieces 53 in the elongated holes 54a for engagement, and it may be pivotably supported to the lock bracket 50a so that the pivot center L is separated from the lock nails 55.

(4) Three support pieces 53 and three elongated holes 54a are provided. However, the number is not limited to three and one or two, otherwise four or more support pieces 53 and elongated holes 54a may be provided.

(5) The support portion 53a is formed in a generally C-shape in cross section. However, the shape is not limited to that and the support portion 53a may be formed in a shape in which the elongated hole to inserted with the support portion 53a has such a shape that the support portion 53a cannot easily come off from the elongated hole 54a.

(6) Three protrusions 54b and three openings 52a are provided. However, the number is not limited to three and one or two, otherwise four or more protrusions 54b and openings 52a may be provided.

(7) In the above Second Embodiment, only one balancer, the balancer 81, for example, of the balancers 84, 85 for adjusting the position of the center of gravity of the tilting body mentioned above may be used to adjust the position of the center of gravity of the tilting body mentioned above, otherwise three or more balancers may be used for adjustment of the above mentioned tilting body. Or the position of the center of gravity of the tilting member 83 may be adjusted to adjust the position of the center of gravity of the tilting body.

(8) in the above Second Embodiment, the elongated hole 83b of the tilting member 83 may be changed to a through hole through which the second shaft 86 is inserted so as not to make a relative movement, and the through holes 84b, 85b of the balancers 84, 85 may be changed to elongated holes through which the second shaft 86 engages so as to allow a relative movement in the vertical direction. In this case, in a locked state, the second shaft 86 contacts the inner circumferential face of the lower part of the elongated hole of the both balancers 84, 85.

(9) In the above Second Embodiment, the elongated hole 83b of the tilting member 83 is formed lengthy in the vertical direction. However, the configuration is not limited thereto, and the elongated hole 83b may be formed into such a shape that the second shaft 86 can move around the first shaft 82 in the circumferential direction.

(10) In the above Second Embodiment, the tilting member 83 and the support portion 93 of the operation lever 90 are connected via the spring 87 interposed between the outer face of the connecting portion 83 and the inner face of the concave portion 93a. However, the configuration is not limited thereto, and a concave portion may be formed at a part of the operation lever side of the tilting member 83, a convex portion may be formed on the tilting member side of the support portion 93, and they may be connected via she spring 87 interposed between the inner face of the concave portion and the outer face of the convex portion. In this way, too, the operation lever 90 and the tilting members 83 of both the inside rail and the outside rail are connected so as to prevent them from rattling.

(11) In the Second Embodiment, the spring 87 is formed by bending a plate-like elastic member into a U-shape. However, the configuration is not limited thereto, and the spring 87 may be shaped so as to be interposed between the outer face of the connecting portion 83c of the tilting member 83 and the inner face of the concave portion 93a of the support portion 93 of the operation lever 90.

DESCRIPTION OF REFERENCE NUMERALS

10 Seat sliding device
20 Upper rail (upper rail member)

22a, 23a Notches (engaged parts on the upper rail side)
30 Lower rail (lower rail member)
35a Notch (engaged part on the lower rail side)
50 Lock member
50a Lock bracket
50b Pivoting member
52a Opening
53 Support piece
53a Support portion
54a Elongated hole
54b Protrusion
55 Locking nail (locking side engaging part)
56 Tilted portion
56a Through hole
60 Biasing member
61 Balancer support member
62 Shaft
63 Balancer bracket
63a Side board
63b Through hole
63c Connecting portion
63d Extending piece
64 Balancer
64c Connecting piece
70 Operation lever (operation member)
71 Gripper
72 Connecting portion
73 Support body
73a Through hole
80 Biasing member
82 First shaft
83 Tilting member (first tilting member)
83b Elongated hole (engaging hole)
84 Balancer (second tilting member)
85 Balancer
86 Second shaft (engaging shaft)
B Vehicle floor (vehicle body)
L Pivot center
S vehicle seat

The invention claimed is:

1. A seat sliding device comprising:
a lower rail member fixed to a vehicle body;
an upper rail member fixed to a seat and slidably provided to the lower rail member;
a lock member having a locking side engaging part which can engage with or disengage from an engaged part on the lower rail side of the lower rail member and an engaged part on the upper rail side of the upper rail member; and
an operation member which is operated to switch between a locked state in which the locking side engaging part engages with an engaging part on the lower rail side and an engaging part on the upper rail side and an unlocked state in which the locked state is released, wherein
the seat sliding device includes a biasing member, which biases the lock member in an unlocking direction in response to the operation of the operation member for switching to the unlocked state and which is pivotable around a predetermined tilting center together with the operation member, wherein
the position of the center of gravity of the biasing member is adjusted so that the position of the center of gravity of a tilting body including the operation member and the biasing member, which tilts around the predetermined tilting center by operation of the operation member, is brought close to the predetermined tilting center.

2. The seat sliding device according to claim 1, wherein the biasing member includes a contact part, which contacts the operation member tilting around the predetermined tilting center from the locked state to an unlocking direction, and the biasing member is formed so that it does not contact the operation member tilting around the predetermined tilting center from the locked state to a counter unlocking direction.

3. The seat sliding device according to claim 1 comprising:
a first tilting member which tilts around the predetermined tilting center in response to the operation of the operation member; and
a second tilting member which is tiltably supported around the predetermined tilting center and which can bias the lock member in the unlocking direction, wherein
an engaging hole is formed on either one of the first tilting member or the second tilting member and an engaging shaft is formed on the other tilting member, the engaging shaft engaging with the engaging hole so as to allow a relative movement around the predetermined tilting center in the circumferential direction,
the second tilting member tilts together with the first tilting member in the unlocking direction, by bringing the engaging shaft in contact with the inner circumferential face of the engaging hole when the first tilting member tilts from the locked state to the unlocking direction, and biases the lock member in the unlocking direction, and
a position of a center of gravity of at least one member of the first tilting member and the second tilting member is adjusted so as to bring the position of the center of gravity of the tilting body close to the predetermined tilting center.

4. The seat sliding device according to claim 3, comprising a biasing piece which biases the first tilting member in the unlocking direction by such a biasing force that does not unlock the lock member.

5. The seat sliding device according to claim 3, wherein the operation member and the first tilting member are connected, via an elastic member which is elastically deformable, between an inner face of a concave portion formed on either one member and a convex portion formed on the other member.

* * * * *

UNITED STATES PATENT AND TRADEMARK OFFICE
CERTIFICATE OF CORRECTION

PATENT NO. : 8,360,383 B2  
APPLICATION NO. : 12/994749  
DATED : January 29, 2013  
INVENTOR(S) : Kimura et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 170 days.

Signed and Sealed this
First Day of September, 2015

Michelle K. Lee
*Director of the United States Patent and Trademark Office*